(12) United States Patent
McGrath et al.

(10) Patent No.: US 8,029,241 B2
(45) Date of Patent: Oct. 4, 2011

(54) WIND TURBINE ROTOR BLADE WITH AERODYNAMIC WINGLET

(75) Inventors: Edward Lee McGrath, Greer, SC (US); David Samuel Pesetsky, Greenville, SC (US); Jing Wang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/882,423

(22) Filed: Sep. 15, 2010

(65) Prior Publication Data

US 2011/0142642 A1 Jun. 16, 2011

(51) Int. Cl.
*F03D 11/00* (2006.01)
(52) U.S. Cl. ............ 416/228; 416/61; 416/87; 416/88; 416/132 B; 416/142
(58) Field of Classification Search ............ 416/87, 416/88, 132 B, 228, 241 R, 142
See application file for complete search history.

(56) References Cited

U.S. PATENT DOCUMENTS

| 6,972,498 | B2 | 12/2005 | Jamieson |
| 2010/0068058 | A1* | 3/2010 | Sorensen ................ 416/41 |
| 2010/0092288 | A1 | 4/2010 | Sorensen |
| 2010/0135806 | A1* | 6/2010 | Benito .................. 416/147 |
| 2010/0266408 | A1* | 10/2010 | Dawson et al. ............ 416/87 |

FOREIGN PATENT DOCUMENTS

| DE | 29723456 U1 * | 10/1998 |
| WO | WO2008/077403 | 7/2008 |

* cited by examiner

*Primary Examiner* — Ninh H Nguyen
*Assistant Examiner* — Liam McDowell
(74) *Attorney, Agent, or Firm* — Dority & Manning, P.A.

(57) ABSTRACT

A wind turbine includes a plurality of rotor blades, with each blade having a root portion connected to a rotor hub and an airfoil portion extending radially outward from the rotor hub. The airfoil portion further includes a main foil section and a winglet pivotally connected to the main foil section so as to pivot from an in-line position wherein the rotor blade has a first sweep length to an articulated position wherein the rotor blade has a second sweep length. In the articulated position, the winglet may pivot to not more than 90 degrees relative to a longitudinal axis of the main foil section. A deployable sleeve may be connected to the winglet so as to extend between the winglet and the main foil section in the articulated position of the winglet. The sleeve is stowable within either or both of the main foil section or the winglet in the in-line position of the winglet.

15 Claims, 6 Drawing Sheets

WIND TURBINE ROTOR BLADE WITH AERODYNAMIC WINGLET

FIELD OF THE INVENTION

The present subject matter relates generally to wind turbines, and particularly to wind turbine rotor blades having an aerodynamic winglet configuration.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components but may also increase the risk of a sudden catastrophic failure of the rotor blades, for example when excess loading causes deflection of a blade resulting in a tower strike.

Load control is thus a crucial consideration in operation of modern wind turbines. For example, active pitch control systems are widely used to reduce the load on the rotor blades by varying the pitch of the blades in high load conditions. U.S. Pat. Appln. Pub. No. 2010/0092288 describes a pitch-adjustable blade with a root-end bearing having a pitch axis that is angled relative to the longitudinal axis of the blade. With this configuration, the blade moves into and out of the rotor plane when pitched, which essentially changes the effective length of the blade. It is also known to vary the aerodynamic characteristics of the individual rotor blades as a means of load control, for example with controllable vortex elements, flaps, tabs, and the like configured on the blade surfaces.

U.S. Pat. No. 6,972,498 describes various wind turbine blade configurations wherein a retractable extension is provided on a base blade segment to reduce the effective length of the blade in high load conditions. In a particular embodiment, the blade extension is hinged to the base blade segment and jackknifes between a fully extended position and a fully retracted position wherein the blade extension folds into the base blade segment. The articulation joint for this type of arrangement results in open sections along the blade edge, which could produce noise and adversely affect the aerodynamic performance of the blade in the retracted (partially or fully) position of the blade extension.

Accordingly, the industry would benefit from an improved system for reducing the effective length of a wind turbine rotor blade in high load conditions.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine is provided having a plurality of rotor blades. Each rotor blade has a root portion connected to a rotor hub and an airfoil portion extending radially outward from the rotor hub. The airfoil portion further includes a main foil section and a winglet. The winglet is pivotally connected to the main foil section and pivots from an in-line position wherein the rotor blade has a first sweep length to an articulated position wherein the rotor blade has a second sweep length that is less than the first sweep length. A deployable sleeve is connected to the winglet so as to extend between the winglet and the main foil section in the articulated position of the winglet. The sleeve provides an aerodynamic surface that bridges the gap between the winglet and the main foil section in the articulated position of the winglet and is stowable within the main foil section or the winglet in the in-line position of the winglet.

In various embodiments, the sleeve may be a pre-formed member, such as an arcuate shell, that swings into the main foil section in the in-line position of the winglet, and swings out of the main foil section as the winglet moves to the articulated position. In an alternate embodiment, the sleeve may include a pliable material that folds into the main foil section or winglet. For example, the pliable material may be a material sheet, a pleated sheet, and so forth. In still another embodiment, the pliable material may be an elastic sheet or other member that stretches between the winglet and main foil section in the articulated position of the winglet.

Any manner of suitable actuating mechanism may be operably configured with the winglet to move the winglet to the articulated position, to the in-line position, or between both positions. The actuating mechanism may be, for example, an active device that is actuated by a control signal to move the winglet between the in-line position and articulated position. The active device may be, for example, an electrical actuator (i.e., a motor), electro-mechanical device, pneumatic or hydraulic device, and so forth.

In still further embodiments, the actuating mechanism may include a biasing device that is configured to bias the winglet to either of the in-line or articulated positions. An active device may be used to move the winglet to the other respective position in opposition to the biasing device.

It may be desired to include a sensor that is disposed relative to the winglet and the main foil section to indicate when the winglet is in the in-line position. The sensor may be in communication with the turbine controller for any manner of control function.

In certain embodiments, it may be useful to include a controllable lock mechanism between the winglet and the main foil section of the turbine blade, with the winglet movable to the articulated position only upon release of the lock. In this embodiment, the winglet may be biased to the articulated position by a spring or other biasing element, and retractable to the in-line position by an active actuating mechanism.

In alternate embodiments, a wind turbine is provided having a plurality of rotor blades. Each rotor blade has a root portion connected to a rotor hub and an airfoil portion extending radially outward from the rotor hub. The airfoil portion farther includes a main foil section and a winglet. The winglet is pivotally connected to the main foil section and pivots from an in-line position wherein the rotor blade has a first sweep length to an articulated position wherein the rotor blade has a second sweep length that is less than the first sweep length. A hinge joint is provided between the winglet and the main foil section along a side of the blade, with the winglet being pivotal towards the respective side. An actuating mechanism is operably configured with the winglet to move the winglet to the articulated position, wherein in the articulated position the winglet pivots to not more than 90 degrees relative to a longitudinal axis of said main foil section.

The present invention also encompasses individual wind turbine rotor blades incorporating any of the winglet features or embodiments discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
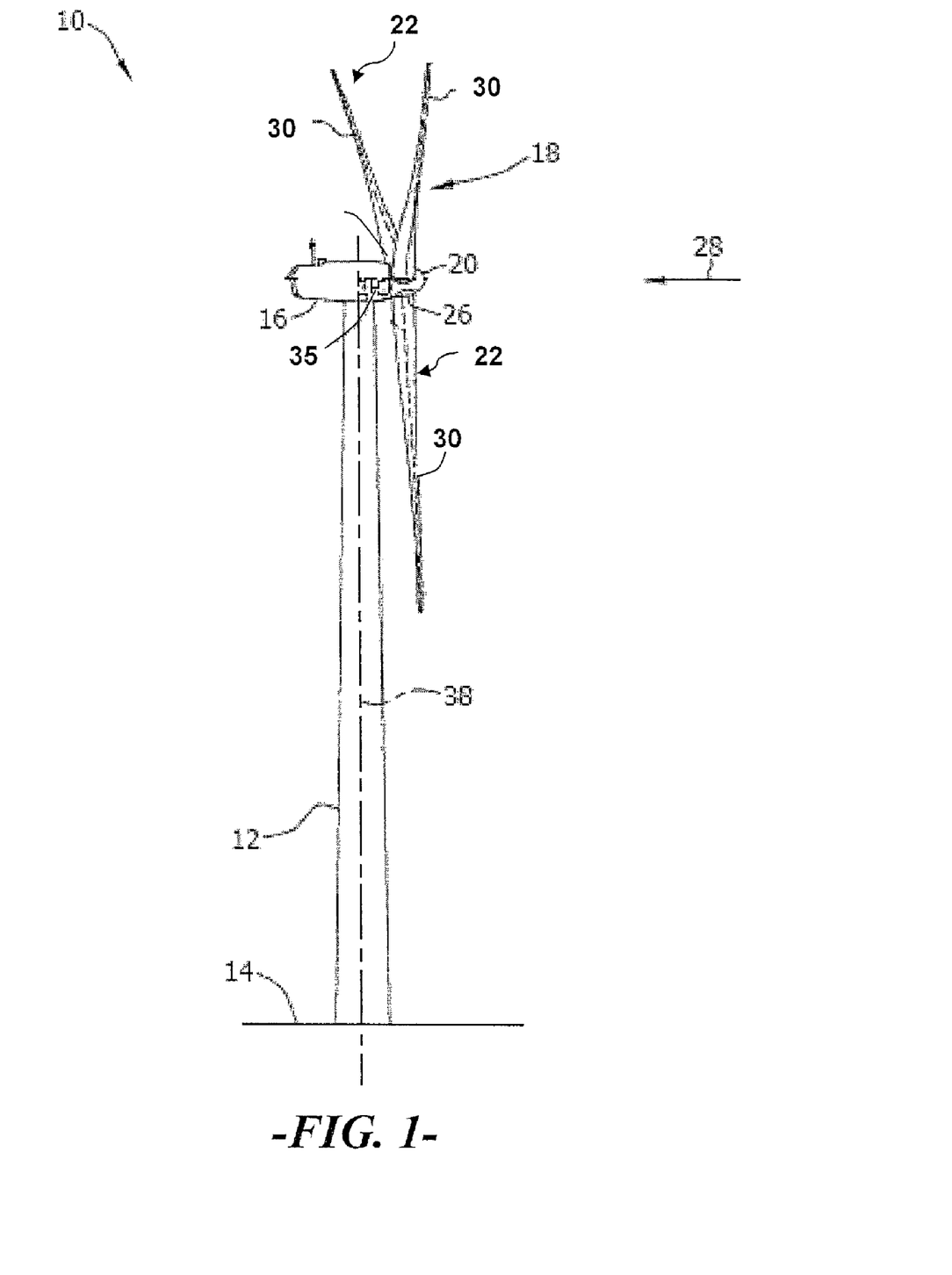
FIG. 1 is a perspective view of a wind turbine.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12 that extends from a support 14, a nacelle 16 mounted on the tower 12, and a rotor 18 that is coupled to the nacelle 16. The tower 12 may be fabricated from tubular steel or other suitable material and defines a cavity (not illustrated) between the support 14 and the nacelle 16. The rotor 18 includes a rotatable hub 20 and rotor blades 22 coupled to and extending radially outward from the hub 20. As shown, the rotor 18 includes three rotor blades 22. However, in an alternative embodiment, the rotor 18 may include more or less than three rotor blades 22.

The rotor blades 22 may generally have any suitable length that enables the wind turbine 10 to function according to design criteria. For example, the rotor blades 22 may have a length ranging from about 15 meters (m) to about 91 m. The rotor blades 22 are spaced about the hub 20 to facilitate rotating the rotor 18 to enable kinetic energy to be transferred from the wind into usable mechanical energy, and subsequently, electrical energy. Specifically, the hub 20 may be coupled to an electric generator (not illustrated) disposed within the nacelle 16 for production of electrical energy. Further, the rotor blades 22 are mated to the hub 20 by coupling a blade root portion 24 to the hub 20 at a plurality of load transfer regions 26. Thus, any loads induced to the rotor blades 22 are transferred to the hub 20 via the load transfer regions 26.

As shown in the illustrated embodiment, the wind turbine may also include a turbine control system or turbine controller 35 located within the nacelle 16. However, it should be appreciated that the controller 35 may be disposed at any location on or in the wind turbine 10, at any location on the support 14, or generally at any other suitable location. The controller 35 may include suitable processors and/or other processing functionality configured to perform the methods, steps, operations, calculations, and the like, described herein. For example, in one embodiment, the controller 35 may be configured as a computer or other central processing unit. Further, the controller 35 may also include various input/output channels and/or devices for receiving inputs from sensors and other measurement devices and for sending control signals to various components of the wind turbine.

By executing wind turbine control commands, the controller 35 may generally be configured to control the various operating modes of the wind turbine 10 (e.g., start-up or shut-down sequences). The controller 35 may also be configured to control the blade pitch or pitch angle of each of the rotor blades 22 (i.e., an angle that determines a perspective of the rotor blades 22 with respect to the direction 28 of the wind) to control the load and power generated by the wind turbine 10 by adjusting an angular position of at least one rotor blade 22 relative to the wind. For instance, the controller 35 may control the pitch angle of the rotor blades 22, either individually or simultaneously, by transmitting suitable control signals to a pitch drive or pitch adjustment system within the nacelle 16. Further, as the direction 28 of the wind changes, the controller 35 may be configured to control the position of the nacelle 16 relative to a yaw axis 38 via a yaw drive mechanism within the nacelle 16 to position the rotor blades 22 with respect to the direction 28 of the wind.

During operation of the wind turbine 10, wind strikes the rotor blades 22 from the direction 28, which causes the rotor 18 to rotate. As the rotor blades 22 are rotated and subjected to centrifugal forces, the rotor blades 22 are also subjected to various loading forces and bending moments. As aerodynamic loads increase, excessive forces and bending moments can cause one or more of the rotor blades 22 to strike the tower 12 resulting in significant damage and downtime. However, even without a tower strike, excessive loading and bending moments can cause significant fatigue on the rotor blades 22 and other wind turbine components.

Figure 3:
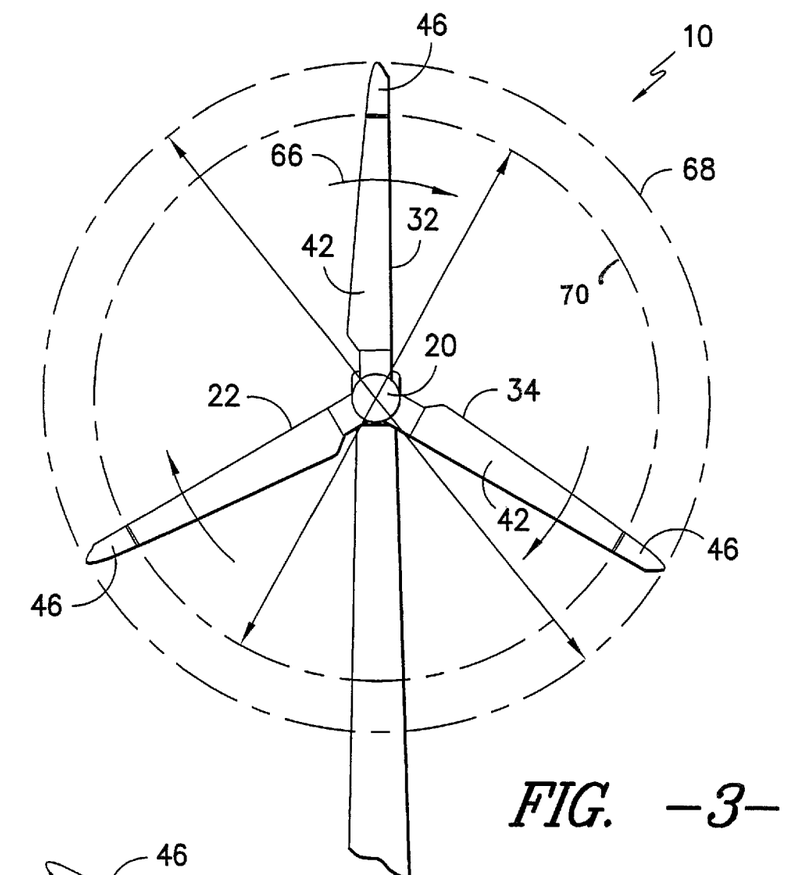
FIG. 3 is a front view of a wind turbine having rotor blades with winglets and illustrates the different rotor sweep areas for the in-line and articulated position of the winglets.
Figure 4:
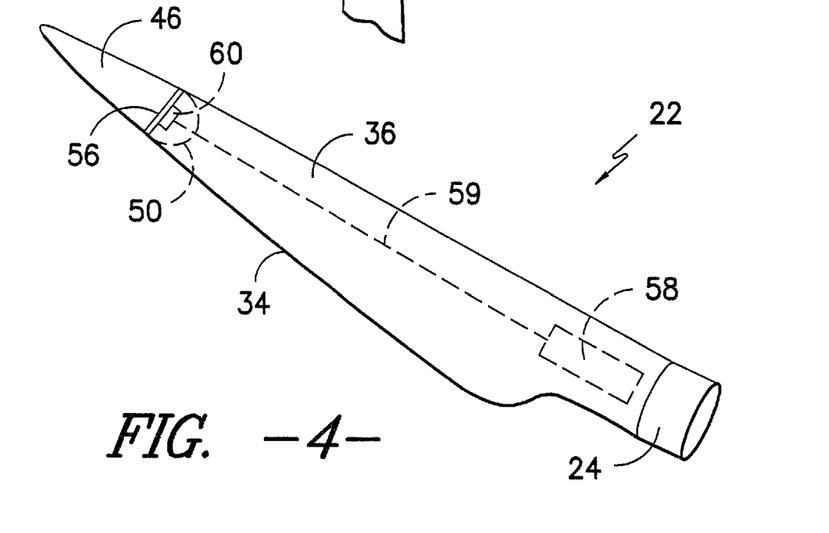
FIG. 4 is a perspective view of a rotor blade incorporating a winglet.
Figure 5:
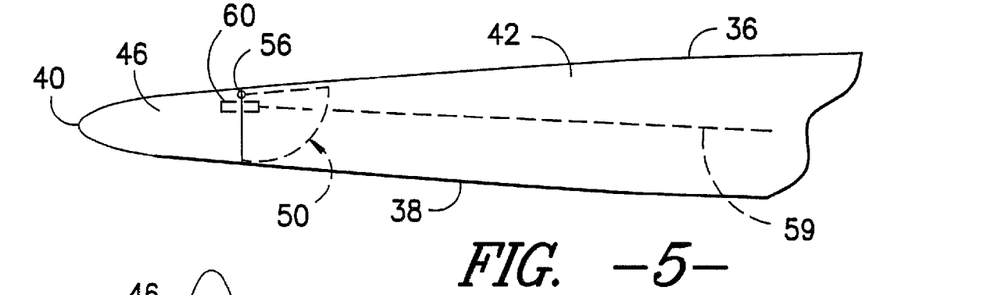
FIG. 5 is a side view of a portion of a rotor blade with a first embodiment of a winglet.

Referring to FIGS. 3 and 4, as is well known in the art, individual rotor blades 22 include a leading edge 32 and a trailing edge 34 relative to a direction of rotation 66 of the blades (FIG. 3). The blades 22 include a low pressure or "suction" side 38, as well as a pressure side 36 (FIG. 5).

Figure 2A:
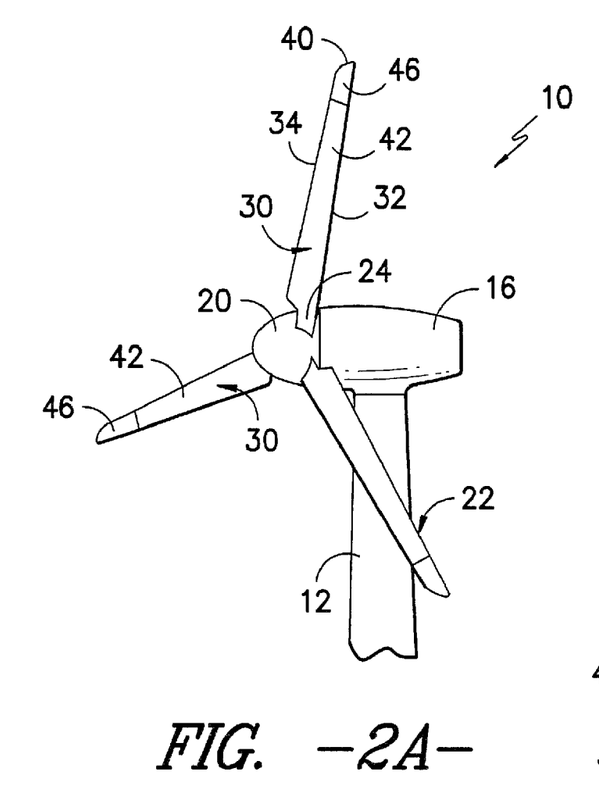
FIG. 2A is a perspective view of a wind turbine with rotor blades having winglets in the in-line position.
Figure 2B:
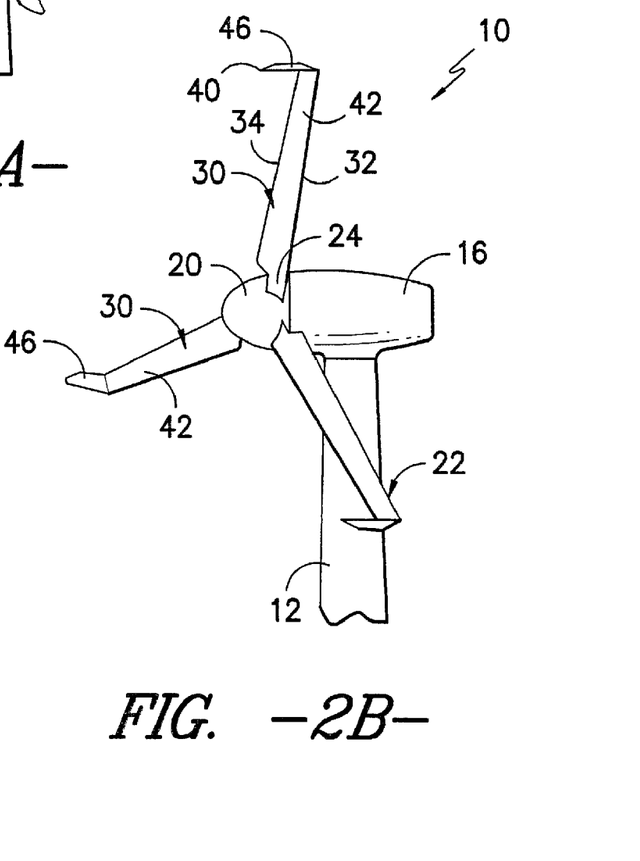
FIG. 2B is a perspective view of the wind turbine of FIG. 2A with winglets in the articulated position to reduce the rotor sweep area.

FIGS. 2A and 2B illustrate an embodiment of a wind turbine 10 that incorporates a plurality of turbine blades 22. Each turbine blade 22 has a root portion 24 that is connected to a rotor hub 20, and further includes an airfoil portion 30 that extends radially outward from the rotor hub. The airfoil portion 30 includes a main foil section 42 and a winglet 46 that defines the blade tip 40. The winglet 46 is pivotally connected to the main foil section 42 and pivots from an in-line position illustrated in FIG. 2A wherein the rotor blade has a first sweep length 68, as indicated in FIG. 3. The winglets 46 pivot to an articulated position illustrated in FIG. 2B wherein the rotor blade has a second sweep length 70, as illustrated in FIG. 3. Thus, it can be readily appreciated from FIGS. 2A, 2B, and 3 that in the articulated position of the winglets 46, the sweep area of the rotor is significantly reduced, which results in a decreased load on the individual rotor blades 22.

Referring to FIG. 4, any manner of suitable actuating mechanism 58 may be provided at any location within the airfoil portion 30 of the blade 22 for moving the winglet 46 between the in-line and articulated positions. FIG. 4 graphically depicts the actuating mechanism 58 as a piston that is connected to the winglet 46 by any manner of suitable linkage 59. It should be readily appreciated that the actuating mechanism 58 may be any manner of active control mechanism that receives a control signal to retract and/or deploy the winglet 46. For example, the actuating mechanism 56 may be an electric motor, an electro-mechanical actuator, a pneumatic or hydraulic system, and so forth. It should be readily appreciated that the present invention is not limited to any particular type of actuating mechanism 58.

Figure 6:
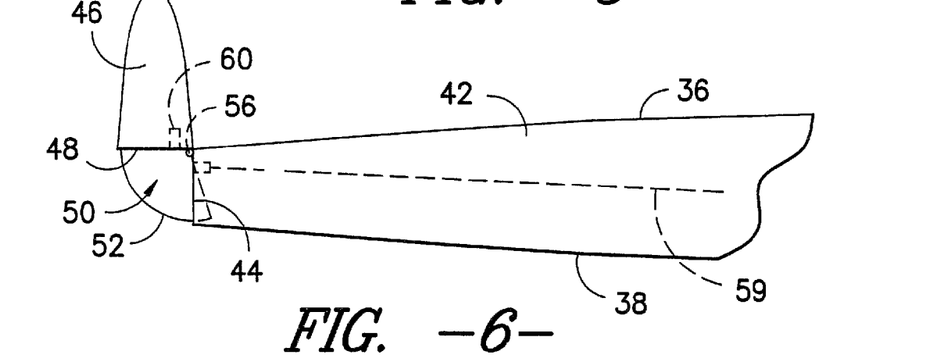
FIG. 6 is a side view of the rotor blade portion of FIG. 5 with the winglet in the articulated position.
Figure 8:
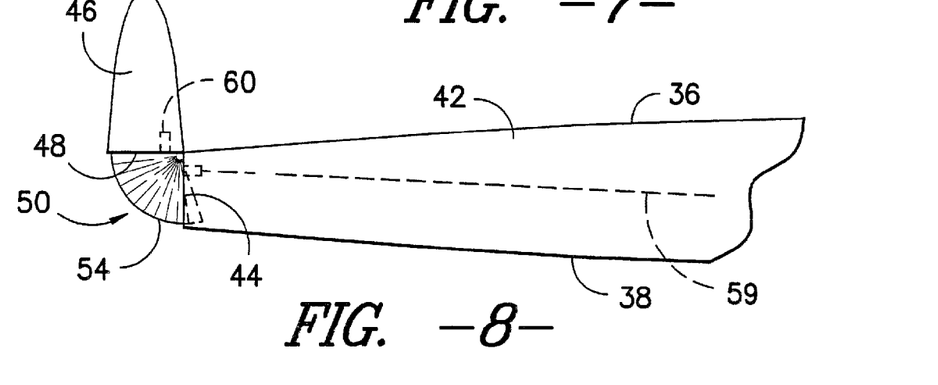
FIG. 8 is a side view of the rotor blade portion of FIG. 7 with the winglet in the articulated position.
Figure 10:
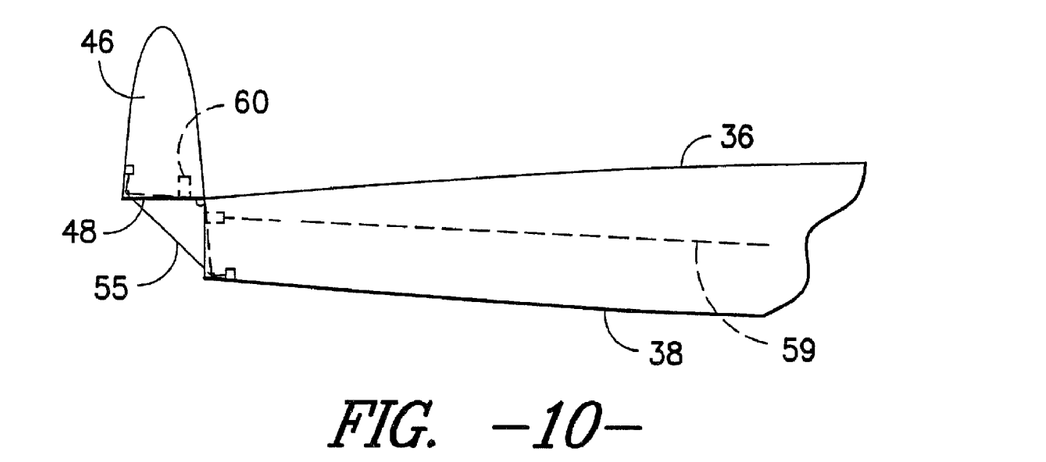
FIG. 10 is a side view of the rotor blade portion of FIG. 9 with the winglet in the articulated position; and, FIG. 11 is a front view of a wind turbine with rotor blades in accordance with aspects of the invention.

It may be desired (but not necessary) that the actuating mechanism be structurally configured and controlled to limit the articulation position of the winglet 46 so that the winglet does not pivot to a position that is greater than 90 degrees relative to the longitudinal axis of the main foil section 42. In other words, the winglet 46 is prevented from pivoting to a position that would cause the winglet to extend back over the main foil section 42 to prevent possible adverse effects on the airflow over the main foil section (or performance of the main foil section 42). FIGS. 6, 8, and 10 depict the winglet 46 in an articulated position of about 90 degrees relative to the main foil section 42. Articulation to greater than 90 degrees is, however, within the scope and spirit of the invention.

It should also be appreciated that the winglet 46 may be variably articulated relative to the main foil section. For example, the winglet 46 may be articulated to any position within the range of greater than 0 degrees to not more than 90 degrees relative to the main foil section 42.

Referring particularly to FIGS. 5 and 6, the rotor blades 22 include a deployable sleeve 50 that is configured between the winglet 46 and main foil section 42. The sleeve 50 is configured so as to extend from an end 48 of the winglet 46 to an end 44 of the main foil section 42 in the articulated position of the winglet, as particularly illustrated in FIG. 6. The sleeve 50 thus provides an aerodynamic surface over the gap that would otherwise be created between the winglet 46 and main foil section 42 in the articulated position of the winglet 46. In addition to providing an aerodynamic surface at this juncture, the sleeve 50 reduces noise that would be generated by the gap (and exposed structure in the gap) when the winglet 46 is in the articulated position.

FIGS. 5 and 6 illustrate an embodiment wherein the deployable sleeve 50 has a pre-formed arcuate shape. The sleeve 50 may be, for example, a relatively rigid or semi-rigid shell member 52 that swings into the main foil section 42 in the in-line position of the winglet 46, as illustrated in FIG. 5, and swings out of the main foil section 42 as the winglet 46 is moved to the articulated position as illustrated in FIG. 6. The shell member 52 may be compressible so as to fit within the main foil section, but assumes its pre-formed arcuate shape upon deployment to bridge between the end 48 of the winglet 46 and the end 44 of the main foil section 42, thereby providing a preformed aerodynamic surface at the juncture.

Figure 7:
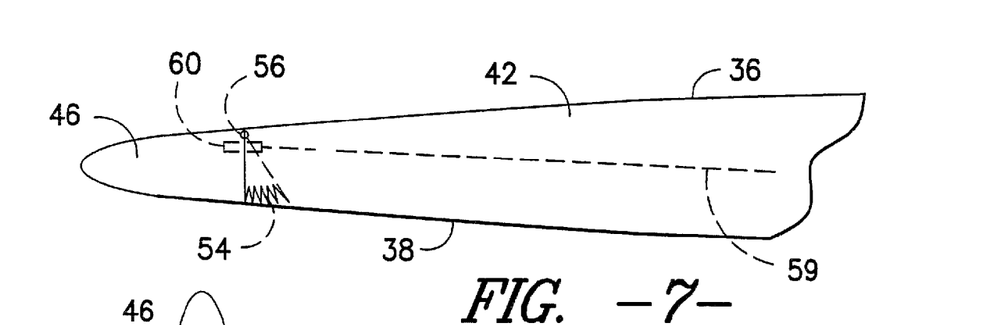
FIG. 7 is a side view of a portion of a rotor blade with a second embodiment of a winglet.

FIGS. 7 and 8 illustrate an alternative embodiment of the deployable sleeve 50. In this embodiment, the sleeve 50 is formed by any manner of pliable material 54. The material 54 may be, for example, a canvas or other suitable sheet material, a pleated material, a collapsible material, and so forth. The material 54 is thus "pliable" in that it is capable of being folded or otherwise reduced in size in a stowed position within either or both of the main foil section 42 or winglet 46, as illustrated in FIG. 7. FIG. 8 illustrates the pliable material 54 as it expands between the end 44 of the main foil portion 42 and the end 48 of the winglet 46. The material 54 may have a degree of pre-formed structure (e.g. as in a pleated material) so as to form an arcuate shape, as depicted in FIG. 8, in the articulated position of the winglet 46.

Figure 9:
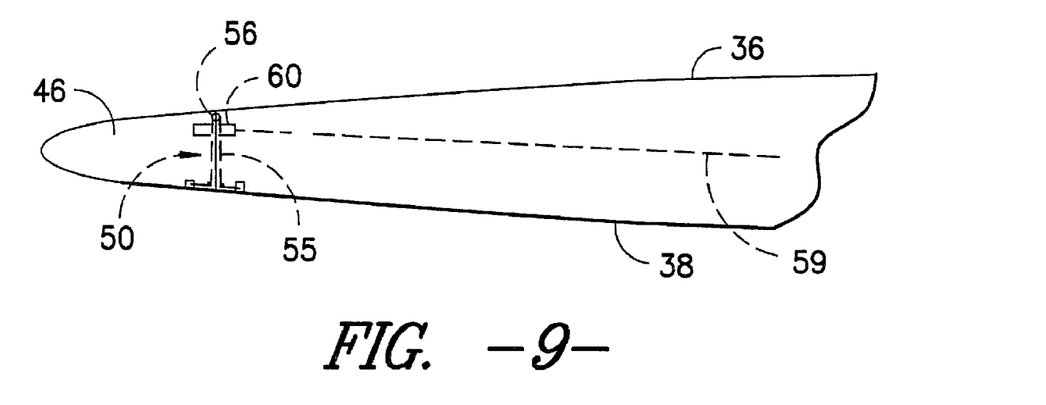
FIG. 9 is a side view of a portion of a rotor blade with a third embodiment of a winglet.

In the embodiment of FIGS. 9 and 10, the deployable sleeve 50 is provided by an elastic sheet or other elastic member 55. The elastic member 55 essentially stretches between the end 44 of the main foil section 42 and the end 48 of the winglet 46 in the articulated position of the winglet as illustrated in FIG. 10. The elastic member 55 thus needs little storage space within the main foil section 42 but provides a less arcuate surface in the articulated position of the winglet 46, as can be seen in FIG. 10.

Referring to the various figures, the winglet 46 is pivotal at a hinge joint 56 that may be defined by any suitable hinge structure, such as a mechanical hinge, a living hinge, and so forth. In a particular embodiment, the winglet 46 pivots at the hinge joint 56 formed on the pressure side 36 of the blade 22. In this manner, the winglet pivots towards the pressure side 36, as particularly illustrated in FIG. 2B. In a particular embodiment, the winglet 46 pivots at least about 90 degrees relative to a longitudinal axis of the main foil section 42. By pivoting towards the pressure side 36 of the blade 22, the winglet 46 does not pose a risk of blade strike with the tower 12 in the articulated position, as can be appreciated from FIG. 2B. However, it should be appreciated that the winglet 46 may pivot towards the suction side 38 in embodiments within the scope and spirit of the invention.

As mentioned, the actuating mechanism 58 may include any manner of suitable actuator. For example, the actuating mechanism 58 may comprise any manner of active device that moves the winglet 46 between the in-line position and the articulated position. In other words, the actuating mechanism 58 may be, for example, a motor or mechanical actuator that is attached to the winglet 46 by any manner of suitable linkage 59 to retract and deploy the winglet 46. In alternative embodiments, the actuating mechanism 58 may include a passive component, such as a spring, or other biasing member. This passive component may be used to bias the winglet 46 to either of the in-line or articulated positions. An active device, such as a motor, piston, or the like, may be used to move the winglet 46 in the respective opposite direction against the bias force of the spring or other biasing member.

Referring to the figures in general, it may be desired in certain embodiments to include a sensor 60 in any suitable location along the hinge line 56 between the winglet 46 and main foil portion 42. This sensor 60 may be any mariner of contact switch, reed switch, and the like, that produces a signal to indicate the relative position of the winglet 46. For example, the sensor 60 may indicate when the winglet 46 is in its in-line position as illustrated in FIG. 9. Alternatively, the sensor 60 may indicate when the winglet 46 is in the articulated position of FIG. 10, or any position other than the in-line position of FIG. 9. The sensor 60 may be used to provide an input signal to the wind turbine controller 35 for any manner of control function with respect to the wind turbine 10.

In certain embodiments, it may also be desired to include a lock mechanism between the winglet 46 and main foil section 42. In the figures, this lock mechanism is configured with the sensor 60, but may be in addition to a separate sensor 60. The lock mechanism may be, for example, an electromagnetic lock that releases to allow the winglet 46 to pivot to its articulated position upon receipt of a control signal to the lock 60. In this embodiment, a biasing member, such as a spring or similar device, may be utilized as a component of the actuating mechanism 58 so that upon release of the lock 60, the winglet 46 automatically pivots to its articulated position under the force of the biasing element. To retract the winglet 46 to the in-line position, the actuating mechanism 58 may use any suitable device and appropriate linkage 59 to retract the winglet to the in-line position, at which point the lock 60 is actuated to retain the winglet 46 in a secure and locked in-line position.

Figure 11:
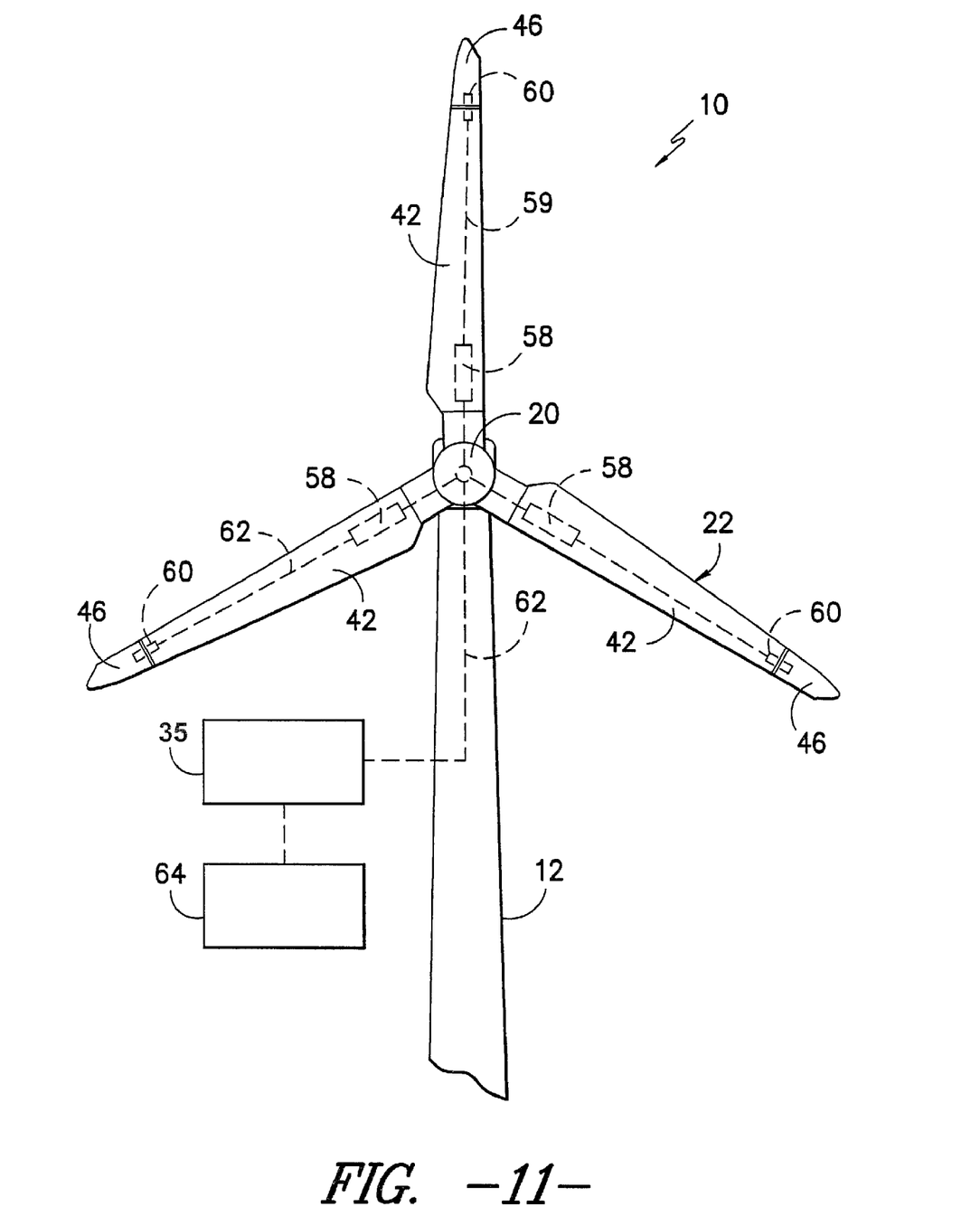

FIG. 11 depicts a wind turbine 10 wherein each of the rotor blades 22 is configured with a winglet 46 as described herein. Control and/or power transmission lines 62 are provided for a coordinated control of the various winglets 46 via the wind turbine controller 35. The controller 35 may, in turn, receive any manner of input from various sensors 64 that are appropriately disposed and configured to sense various operating conditions on the blades 22, such as extreme or transient load conditions experienced by the blades. At such load conditions, the controller 35, via the power/control lines 62 and actuating mechanism 58 (with appropriate linkages 59) can actuate the winglets 46 for the plurality of blades 22 in a controlled and coordinated manner. In order to maintain the overall balance of the rotor 20 and blades 22, the winglets 46 are actuated in unison via their respective actuating mechanism 58.

At the end of the transient or extreme load condition, the winglets 46 can be returned to their in-line position via the controller 35, transmission/power line 62, and actuating mechanisms 58.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
   a plurality of rotor blades, each said rotor blade having a root portion connected to a rotor hub and an airfoil portion extending radially outward from said root portion;
   said airfoil portion further comprising a main foil section and a winglet pivotally connected to said main foil section so as to pivot from an in-line position wherein said rotor blade has a first sweep length to an articulated position wherein said rotor blade has a second sweep length; and,
   a deployable sleeve connected to said winglet so as to extend between said winglet and said main foil section in the articulated position of said winglet, said sleeve stowable within said main foil section or said winglet in the in-line position of said winglet.

2. The wind turbine as in claim 1, wherein said sleeve comprises a pre-formed arcuate shell that swings into said main foil section in the in-line position of said winglet.

3. The wind turbine as in claim 1, wherein said sleeve comprises a pliable material that folds into said main foil section or said winglet.

4. The wind turbine as in claim 3, wherein said pliable material comprises a pleated member that folds into said main foil section or said winglet.

5. The wind turbine as in claim 1, further comprising a hinge joint between said winglet and said main foil section along a pressure side of said blade, said winglet pivotal towards said pressure side.

6. The wind turbine as in claim 5, wherein said winglet pivots to about 90 degrees relative to a longitudinal axis of said main foil section.

7. The wind turbine as in claim 1, further comprising an actuating mechanism operably configured with said winglet to move said winglet to the articulated position.

8. The wind turbine as in claim 7, wherein said actuating mechanism comprises an active device that is actuated by a control signal to move said winglet between the in-line position and articulated position.

9. The wind turbine as in claim 7, wherein said actuating mechanism biases said winglet to the in-line position, and further comprising an active device configured to retract said winglet to the articulated position.

10. The wind turbine as in claim 7, wherein said actuating mechanism biases said winglet to the articulated position, and further comprising an active device configured to extend said winglet to the in-line position.

11. The wind turbine as in claim 1, further comprising a sensor disposed relative to said winglet and said main foil section to indicate when said winglet is in said in-line position.

12. A wind turbine rotor blade, comprising:
    a root portion;
    an airfoil portion extending radially outward from said root portion;
    said airfoil portion further comprising a main foil section and a winglet pivotally connected to said main foil section so as to pivot from an in-line position wherein said rotor blade has a first sweep length to an articulated position wherein said rotor blade has a second sweep length; and,
    a deployable sleeve connected to said winglet so as to extend between said winglet and said main foil section in the articulated position of said winglet, said sleeve stowable within said main foil section or said winglet in the in-line position of said winglet.

13. The wind turbine rotor blade as in claim 12, wherein said sleeve comprises a pre-formed arcuate shell that swings into said main foil section in the in-line position of said winglet.

14. The wind turbine rotor blade as in claim 12, wherein said sleeve comprises a pliable material that folds into said main foil section or said winglet.

15. The wind turbine rotor blade as in claim 12, further comprising a hinge joint between said winglet and said main foil section along a pressure side of said blade, said winglet pivotal towards said pressure side, and an actuating mechanism operably configured with said winglet to move said winglet to the articulated position, wherein in said articulated position said winglet pivots to not more than 90 degrees relative to a longitudinal axis of said main foil section.

* * * * *